(12) United States Patent
Jacob et al.

(10) Patent No.: US 7,256,913 B2
(45) Date of Patent: Aug. 14, 2007

(54) IMAGE ADJUSTMENT

(75) Inventors: Steve A. Jacob, Boise, ID (US); Mark J. Wibbels, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 842 days.

(21) Appl. No.: 10/744,356

(22) Filed: Dec. 23, 2003

(65) Prior Publication Data

US 2005/0134924 A1 Jun. 23, 2005

(51) Int. Cl.
- H04N 1/387 (2006.01)
- H04N 1/409 (2006.01)
- H04N 1/40 (2006.01)
- G06T 5/00 (2006.01)
- B42D 15/00 (2006.01)

(52) U.S. Cl. .......................... 358/1.9; 358/3.27; 283/94

(58) Field of Classification Search .................. 358/1.9, 358/3.26, 3.27, 1.18, 530–532, 538, 452, 358/448; 283/87, 94, 107–110; 359/580, 359/581, 589, 590; 428/195.1, 211.1
See application file for complete search history.

(56) References Cited

U.S. PATENT DOCUMENTS

| | | | |
|---|---|---|---|
| 3,887,742 A * | 6/1975 | Reinnagel | ................. 428/211.1 |
| 5,757,977 A | 5/1998 | Mancuso et al. | |
| 6,173,085 B1 | 1/2001 | Hamilton, Jr. et al. | |
| 6,259,822 B1 | 7/2001 | Hamilton, Jr. et al. | |

FOREIGN PATENT DOCUMENTS

WO WO93/05608 3/1993

* cited by examiner

Primary Examiner—Scott A. Rogers

(57) ABSTRACT

Embodiments of the present invention include devices, media, systems, and methods of image adjustment. One exemplary embodiment includes a printing device having a program and a print engine. The program can apply a filter profile associated with an image filtering material. The program can adjust an image based upon the filter profile. The print engine can be in communication with the program to print an image, adjusted based on the filter profile, on a print media.

35 Claims, 13 Drawing Sheets

| | 7 | -0.0003 | -0.0002 | -0.0008 | -0.0019 | -0.0008 | -0.0002 | -0.0003 |
|---|---|---|---|---|---|---|---|---|
| | 6 | -0.0002 | -0.0006 | 0.0017 | 0.0065 | 0.0017 | -0.0006 | -0.0002 |
| | 5 | -0.0008 | 0.0017 | -0.0178 | -0.0755 | -0.0178 | 0.0017 | -0.0008 |
| Y PIXEL | 4 | -0.0019 | 0.0065 | -0.0755 | 1.3533 | -0.0755 | 0.0065 | -0.0019 |
| | 3 | -0.0008 | 0.0017 | -0.0178 | -0.0755 | -0.0178 | 0.0017 | -0.0008 |
| | 2 | -0.0002 | -0.0006 | 0.0017 | 0.0065 | 0.0017 | -0.0006 | -0.0002 |
| | 1 | -0.0003 | -0.0002 | -0.0008 | -0.0019 | -0.0008 | -0.0002 | -0.0003 |
| | | 1 | 2 | 3 | 4 | 5 | 6 | 7 |

X PIXEL

IMAGE ADJUSTMENT

INTRODUCTION

When creating and presenting images, effort is often taken to refine the quality of an image before it is printed. In digital image processing, refining an image can often be accomplished, for example, by increasing the pixel count of the image or by sharpening specific pixels within the image. These methods of image processing can increase the clarity of the image or portions thereof.

However, digital image processing can only adjust the image in the digital domain and therefore, once the image is printed, the image can no longer be digitally adjusted. Additionally, when image pixels are translated to marks on a print media, unwanted artifacts can appear in the form of mottling and graininess, for example. These artifacts cannot be diminished or eliminated by digital image processing since they are created by the printing process when the image is printed.

Further, coatings are often applied over images, for example, to protect them from damage or to provide a type of finish, such as, a glossy finish to the image. Generally, coatings have optical properties that can affect the image quality when the image is viewed through the coating. Additionally, when adhesive is used, the adhesive also can have optical properties that can affect the image quality when it is viewed through the adhesive. In this way, the combination of the optical properties of the coating and the adhesive can act to influence the viewing of the image.

Both the make-up of coatings and adhesives, as well as the manner in which the coatings are applied, can affect how an image is viewed. The image can, for example, be filtered or blurred in some cases. Thus, viewing quality of an image can be changed by placing coatings and adhesives over the image such that actions taken to improve the image before printing may not result in the viewing quality intended.

DETAILED DESCRIPTION

The exemplary embodiments of the present invention include the digital adjustment of an image on a printing device. Additionally, exemplary embodiments of the invention also account for the properties that image filtering material, e.g. one or more coatings and/or adhesives, possess. Exemplary embodiments also include modification of the image prior to printing to create an intended viewable image once the image filtering material is applied to the image. In some of the exemplary embodiments, the optical filtering properties of the image filtering material, the material can also be used to ameliorate marking artifacts.

Figure 1:
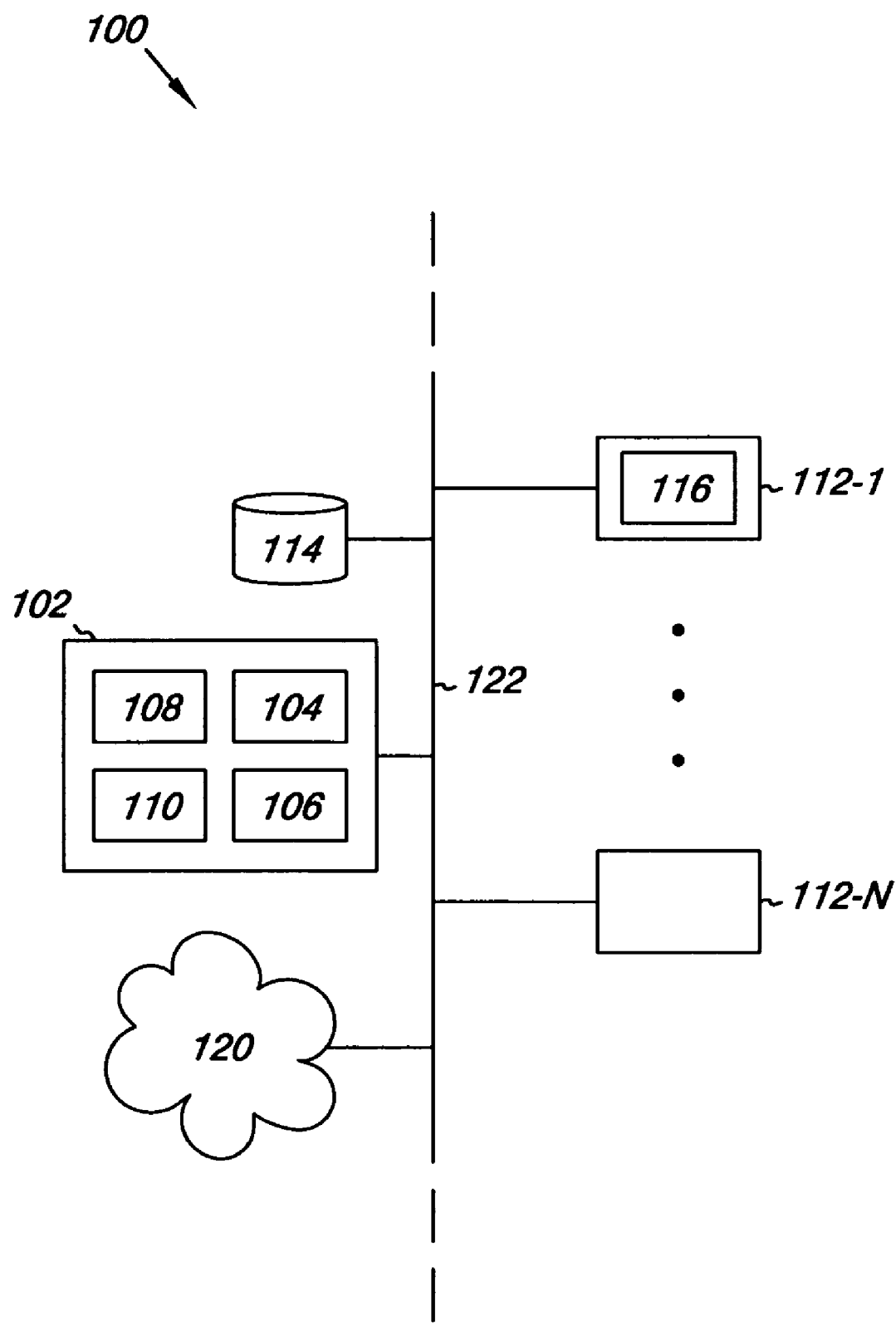
FIG. 1 is an exemplary system environment.

FIG. 1 illustrates an exemplary system environment 100 including a printing device 102. The printing device 102 can be of any type, including but not limited to, inkjet, electrophotographic (e.g. dry and liquid), offset, and thermal dye sublimation, to name a few. In various embodiments, the printing device can be standalone device. The printing device 102 can also include a high speed device, such as the line of HP-Indigo Press printing devices sold by the Hewlett Packard Company.

As shown in FIG. 1, the printing device 102 can include a processor/controller 104, a memory device 106, a print driver 108, and a print engine 110. Memory, as used in this application, can include any suitable memory for implementing the various embodiments. Examples of memory types include Non-Volatile (NV) memory (e.g. Flash memory), RAM, ROM, magnetic media, and optically read media and includes such physical formats as memory cards, memory sticks, memory keys, CDs, DVDs, hard disks, and floppy disks, among others.

The processor 104 is operable on software/programs (e.g. computer executable instructions) for processing information and data. The processor 104 can be operable on programs for interpreting received image data. As used herein, print media can include draft paper, photo paper, and card stock, among others. Embodiments are not limited to a particular type of print media.

In FIG. 1, the printing device 102 includes a print driver 108 and a print engine 110. However, additional print drivers 116 can be located off the printing device 102 such as, for example, on a remote device, e.g. remote device 112-1 in FIG. 1. Such additional print drivers can be an alternative to the print driver 108 located on the printing device 102 or can be provided in addition to the print driver 108.

As one of ordinary skill in the art will appreciate, a print driver 108/116 is operable to create a computer readable instruction set for a print job that can be used for rendering images by the print engine 110. Embodiments are not limited to a particular type of print driver 108/116. The print driver 108/116 can take data from a software application or program and transform the data into a print job.

As shown in FIG. 1, the printing device 102 can be connected to a number of remote devices 112-1, . . . , 112-N over a number of data links, shown as 122. The number of data links 122 can include a physical connection, a wireless connection, and/or any combination thereof, as part of a network. Any number and type of remote devices and remote device types 112-1, ..., 112-N can be connected to the printing device 102. The embodiments of the invention are not so limited.

Remote devices 112-1, ..., 112-N can also include processors and/or application modules suitable for running programs and can include memory devices thereon. Thus, the remote devices 112-1, ..., 112-N can include desktop computers, laptop computers, workstations, and other peripheral devices, e.g. scanning and/or fax capable devices. Embodiments are not limited to these examples.

As shown in FIG. 1, the system 100 can include additional storage devices 114, e.g. remote storage database and the like. Further, the system 100 can include Internet connections 120. And, as stated above, data links 122 within such systems can include any combination of direct or indirect wired and/or wireless connections, including but not limited to electrical, optical, and RF connections.

A remote device, 112-1, ..., 112-N, can be used to initiate a print job to be printed on a printing device 102. As mentioned above, the print job can consist of a computer readable instruction set that provides instructions on how to print an image.

Figure 2:
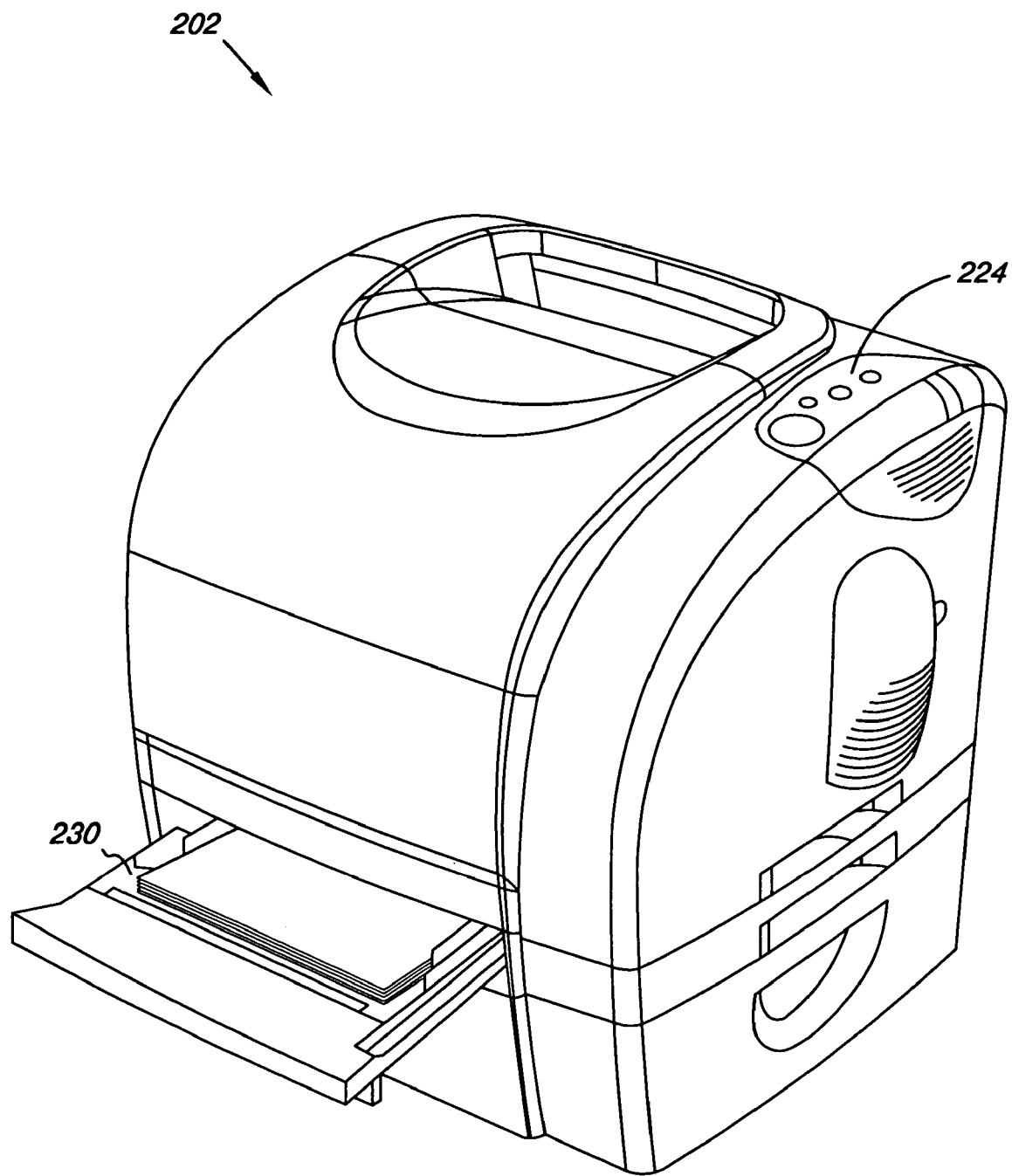
FIG. 2 is an example of a printing device.

FIG. 2 illustrates a printing device. In FIG. 2, the printing device 202 includes a console 224 and a print media supply tray 230. The console 224 can be used to enter information into the printing device 202. The printing device 202 can adjust an image, for example, by digital image sharpening, among other methods. The printing device 202 can also apply an image filtering material to the print media.

Figure 3:
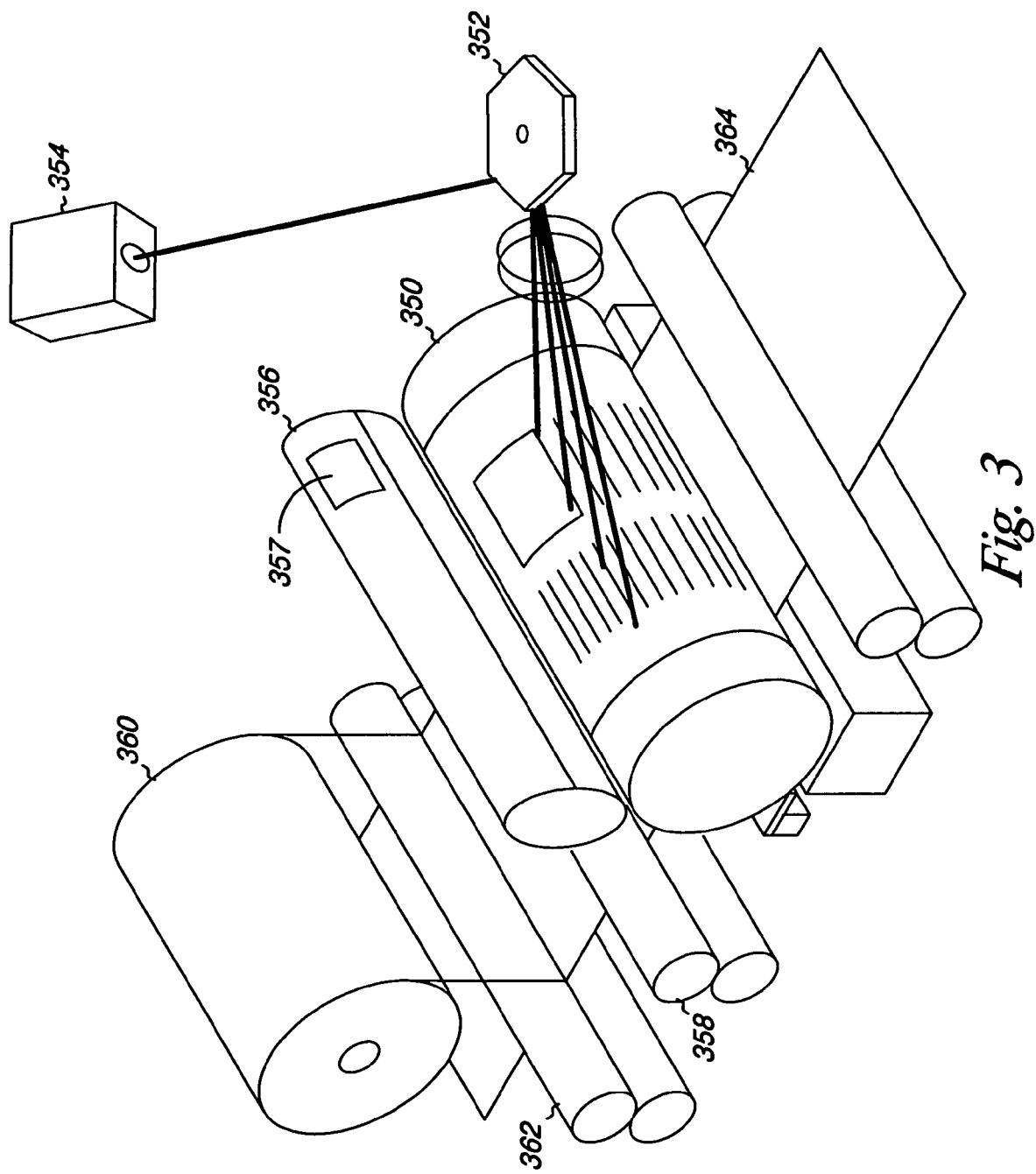
FIG. 3 illustrates an interior mechanism of a printing device.

FIG. 3, for example, illustrates the interior mechanism of an electrophotographic (EP) printer. The EP printer can include a dry EP printing device. The mechanism shown in FIG. 3 includes a drum 350, a mirror 352, a light source 354, a toner reservoir 356, fusing rollers 358, a laminate spool 360, and bonding rollers 362. The laminate spool 360 and the bonding rollers 362 serve as a lamination component. The drum 350 can be used to hold a latent image of an image that is to be printed on the print media 364. The latent image is formed by a beam of energy from a modulated light source 354 that is directed by the mirror 352. The toner reservoir 356 dispenses toner onto the drum 350 adhering toner to the latent image formed by the light source 354.

The filter profile can be provided with the toner or the image filtering material used by a device. For example, a toner reservoir 356, as shown in FIG. 3, can include an integral memory device 357, which can store one or more filter profiles.

The fusing rollers 358 fuse the toner to the print media 364. The laminate spool 360-holds a roll of laminate image filtering film material that is to be bonded onto the surface of the print media 364. The bonding rollers 362 can bond the laminate onto the surface of the print media 364. The embodiments of the invention, however, are not limited to this method of depositing an image filtering material on a print media.

As presented above, a printing device or remote device can be used to digitally adjust an image before it is printed on a print media. Once the image has been adjusted, it can be printed and a coating added thereto and/or the printing device can be used to add a coating, for example, a laminate. The printing device can be part of a system, a network, or can be a standalone device.

As one of ordinary skill in the art will appreciate, embodiments can be performed by software or programs (e.g. computer executable instructions), firmware, and application modules operable on the systems and devices shown herein or otherwise. The embodiments of the invention, however, are not limited to any particular operating environment or to software written in a particular programming language. Software, firmware, and/or application modules, suitable for carrying out embodiments of the present invention, can be resident in one or more devices or locations or in several and even many locations.

Figure 4A:
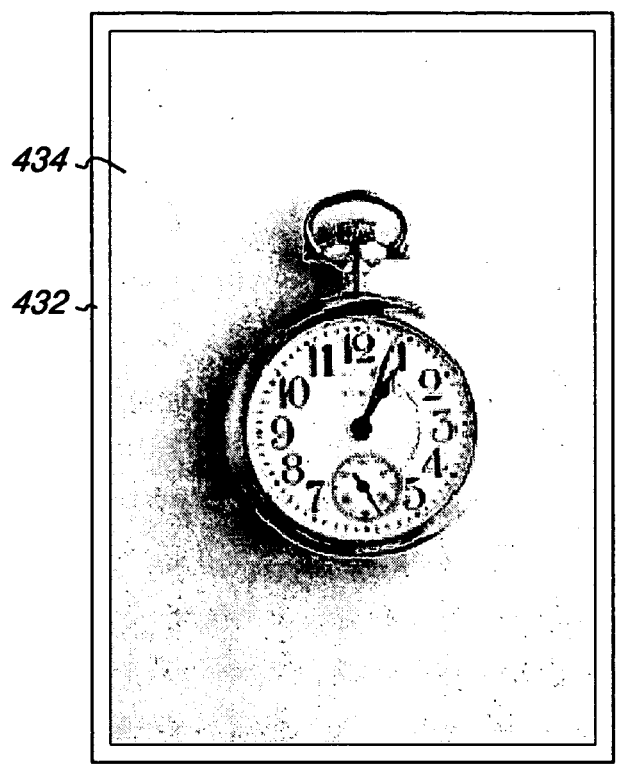
FIG. 4A illustrates an unaltered image.
Figure 4B:
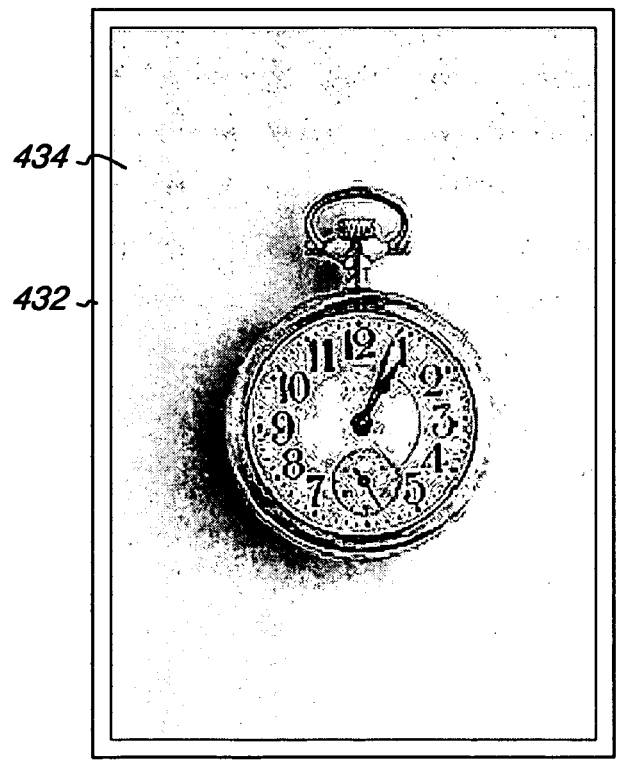
FIG. 4B illustrates a printed media including an image that has been adjusted.
Figure 4C:
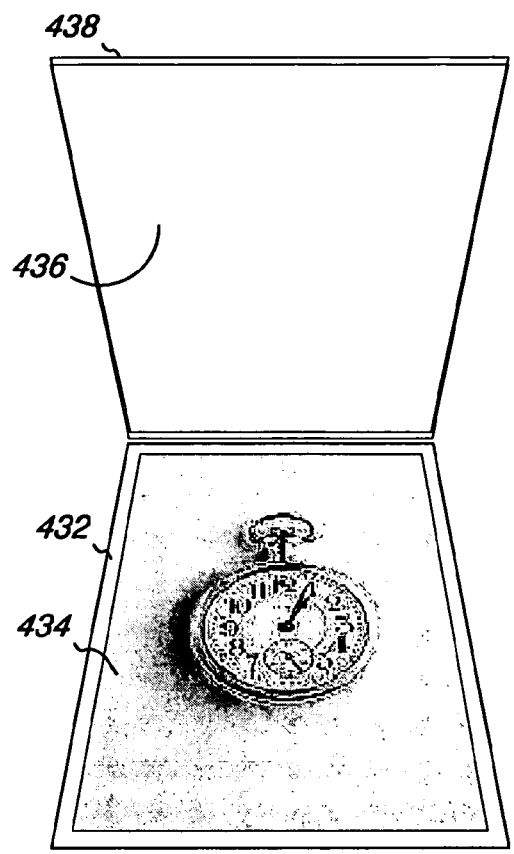
FIG. 4C illustrates an exemplary embodiment of the application of image filtering material on the printed media of FIG. 4B.
Figure 4D:
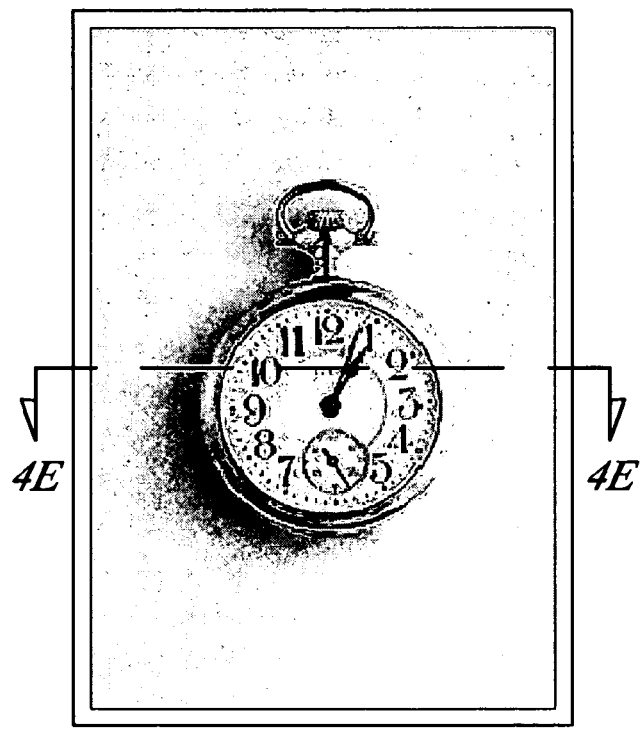
FIG. 4D illustrates an exemplary embodiment including image filtering material positioned over the printed media of FIG. 4B.

FIGS. 4A-4D illustrate an exemplary embodiment of a process for sharpening and coating an image. FIG. 4A illustrates an unaltered image as it would be printed on print media, i.e. with marking artifacts. FIG. 4B illustrates an image that has been digitally sharpened and printed on print media with marking artifacts. FIG. 4C illustrates the application of a coating on the printed media. FIG. 4D illustrates the coated printed media.

FIG. 4A illustrates an unaltered image shown as it would be printed on print media. The image is clear, but in many cases, if an image filtering material were applied to it, the image quality would change. Additionally, when printing an image, artifacts, such as graininess and mottling, can become part of the printed image. If artifacts become part of the image, a low pass filter can be used to blur or smooth the presence of the artifacts.

An image filtering material including, but not limited to, low pass, high pass, or band pass filtering material, among others, can be used as part of an optical image filtering process. Additionally, the processing of an image can include using electronic image processing in connection with the optical image filtering process. This includes using a digital image processing technique, e.g. using low pass, high pass, or band pass digital processing, to adjust an image, among others, in connection with an image filtering material to provide photographic quality images. Images can be digitally transformed in a frequency domain and translated back into a spatial domain for printing, by use of software. Transforming in the frequency domain can include digitally sharpening an image at certain frequencies. That is, as used herein, sharpening an image is intended to mean increasing the amplitude of certain frequency components relating to the appearance of an image.

There are several ways that coatings can be applied to images as part of the optical image filtering process. For example, films of material can be added to the surface of print media having an adjusted image printed thereon. A transparent adhesive can be applied between the printed media, e.g. image, and a film to adhere the film to the print media. Adhesive can be applied to print media by spraying or painting and a film can be applied can be applied by a pressure roller. Embodiments of the invention, however, are not limited to these examples.

A low pass filtering material can be deposited over the image which changes the perception of the image when it is viewed due to the optical properties of the material. When a low pass filtering material coating is used, the image and the artifacts will appear blurred in comparison to uncoated image. Accordingly, an image can be first adjusted digitally with software to perform low pass, high pass, or band pass digital processing on the image. This adjustment can account for one or more image filtering material characteristics (i.e., characteristics of the coatings and/or adhesives) such that when the coatings/adhesives are applied, the image will appear as intended.

The characteristics of the image filtering material and print media material may be known and used to hone a number of image characteristics. Examples of image material characteristics include thickness, clarity, index of refraction, surface roughness, and modulation transfer, to name a few. Embodiments of the invention are not limited to these examples.

FIG. 4B illustrates a print media 432 including an image 434 that has been adjusted, in this example using high pass digital processing, to sharpen the image prior to adding a coating or adhesive thereto. In FIG. 4B, the image has been adjusted by utilizing a convolution filter, as will be discussed in more detail below. The convolution filter can be based on certain low pass filtering properties of a coating and/or adhesive (shown in FIG. 4C) that will be deposited over the image. In this manner, the image is adjusted to take into account the effects of the coating and/or adhesive and produce an intended image quality once the coating and/or adhesive are applied. Those skilled in the art will appreciate that any form of image adjustment can be used within the various embodiments of the invention.

FIG. 4C illustrates an image filtering material 436 and 438, e.g., adhesive and film, being applied to the printed media 432 of FIG. 4B. In FIG. 4C, a two layer structure is applied over a surface of the printed media 432 and image 434. However, the embodiments of the invention are not so limited. The image filtering material can be any type of image filtering material and can be any number of layers.

The two layer structure shown in FIG. 4C can be used to illustrate the use of a film layer 438 and an adhesive layer 436. Film layer 438 can be of any material, such as, for example, polyester. The adhesive layer 436 can be of any material, such as, for example, ethylene vinyl acetate. The film layer 438 and adhesive layer 436 can behave as a low pass image filtering material once applied to the printed media 432 and image 434.

FIG. 4D illustrates the image filtering material from FIG. 4C applied to the printed media 432. FIG. 4D illustrates, that once a low pass image filtering material 436 and/or 438 is applied to the printed media 432, the viewable image 434 is filtered by the low pass image filtering material 436 and/or 438, effectively smoothing the features of the image 434.

Figure 4E:
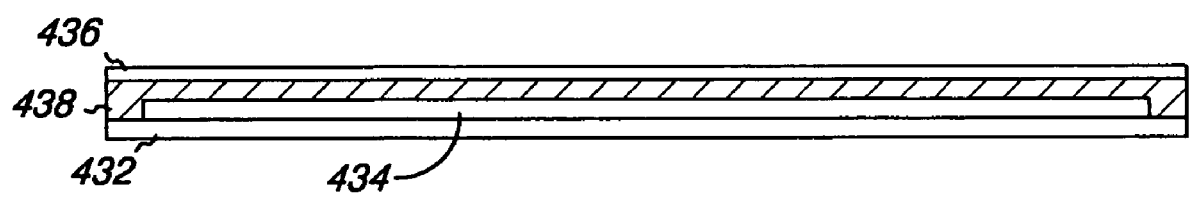
FIG. 4E is a perspective view along line 4E-4E of FIG. 4D.

FIG. 4E is a perspective view along line 4E-4E of FIG. 4D, and depicts the layering of the print media with image filtering material. As shown in FIG. 4E, the printed media 432 includes an image 434 thereon. In this exemplary embodiment, image filtering material, such as film 438 and adhesive 436 are applied over the surface of the printed media 432 having the image 434 printed thereon. As noted above, the applied image filtering material will effect, e.g. filter, the viewable appearance of the image 434.

An image filter profile can be created and used with the digital image adjustment in FIG. 4B in order to account for the optical characteristics of the material that is to be applied. The image filter profile can be based upon an awareness of certain characteristics, such as low pass filter characteristics, of image filtering materials that are to be applied. As used herein, image filtering materials include one or more coatings and/or adhesives. Additionally, the image filter profile can be estimated based upon the types of coatings and/or adhesives most commonly used or available.

FIGS. 5-9B provide exemplary embodiments associated with adjusting an image based upon creating and operating upon an image filter profile. As noted above, embodiments can be performed by one or more programs (computer executable instructions).

Figure 5:
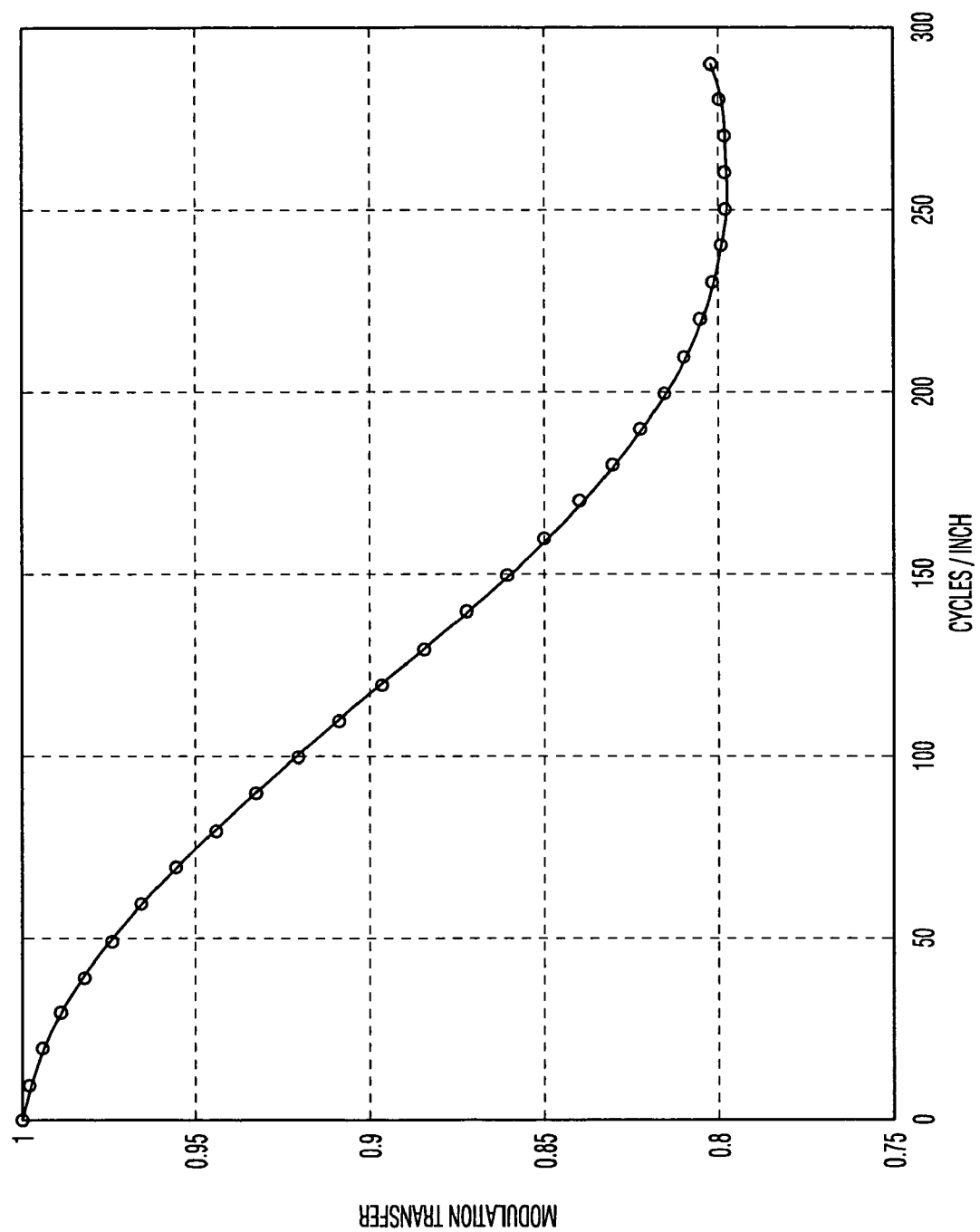
FIG. 5 is graph illustrating a low pass filter profile of a laminate.

FIG. 5 illustrates a modulation transfer function (MTF) graph representing optical characteristics of an image filtering material. As one of ordinary skill in the art will appreciate, an MTF graph is one form of expressing the optical characteristics of an image filtering material. In the example of FIG. 5, a modulation transfer value represents the attenuated modulation of contrast at different frequencies.

An image filtering profile of an image filtering material can be created in various manners. The image filtering profile of the image filtering material can be determined by printing a black area such as a bar or patch, having discrete edges, on print media and covering the print media with the image filtering material to be used. Once applied, the coated print media is scanned. The scan can be interpreted to provide a step function, where the one or more steps are located at the edges of the black area. A Fourier transformation process can then be applied to the step function to determine the image filtering profile. FIG. 5 illustrates a low pass filter profile of a laminate.

In the graph of FIG. 5, the x-axis represents a frequency value expressed as a number of cycles/inch and the y-axis represents a modulation transfer value. The y-axis values in this example can be viewed as the percentage of original contrast value when multiplied by 100.

According to various embodiments, the initial image filter profile is inverted. In one embodiment, the equation:

$$1-MTF \qquad (1)$$

is used to invert the values of the MTF graph. However, embodiments of the invention are not limited to this inversion equation.

The inverted filter profile can be scaled, thereby manipulating the numerical values defining the profile. Scaling factors can be any number and can be an integer or decimal/fractional number. With the illustrations shown, a scaling factor of 3 is used. Generally, a scaling factor of greater than one can act to sharpen an image, e.g., add amplitude to certain frequencies, to a particularly noticeable extent, while a factor less than one, but greater than zero, will sharpen an image to less noticeable degree.

Using this example, Equation 1 can be modified by the scaling factor (SF), as shown in Equation 2 below:

$$(1-MTF) \times SF \qquad (2)$$

The scaled, inverted filter profile can be offset (OFF) such that a specific type of filtering does not occur or occurs less. For example, in the case of a low pass filtering profile material, the inverted filter profile can be offset such that less or no low pass filtering occurs. The offset can be any number and can be an integer or decimal/fractional number but is typically a number from 0 to 1. As shown in the illustrations, an offset value of 1 is used. In the example provided, the offset can be accomplished by modification of Equation 2 as shown below:

$$(1-MTF) \times SF + OFF \qquad (3)$$

The offset can take into account that some filtering of the image will result from application of the image filtering material, such as a lamination layer composed of a polyester film and an Ethylene Vinyl Acetate hot melt adhesive, among other image coatings, to the image on the print media. In other words, a counterbalance is achieved between the electronic effects which results from the digital sharpening process and the physical, optical effects from the application of an image filtering material to the image. Thus, various embodiments can provide combined amounts of both high and low pass filtering to the image.

Again, one skilled in the art will appreciate that the optical characteristics, e.g., low pass filter profile, of the image filtering material (coating and/or adhesive) can be approximated rather than directly measured, for example, in those instances where the image filtering material to be applied is not determined in advance.

Figure 6:
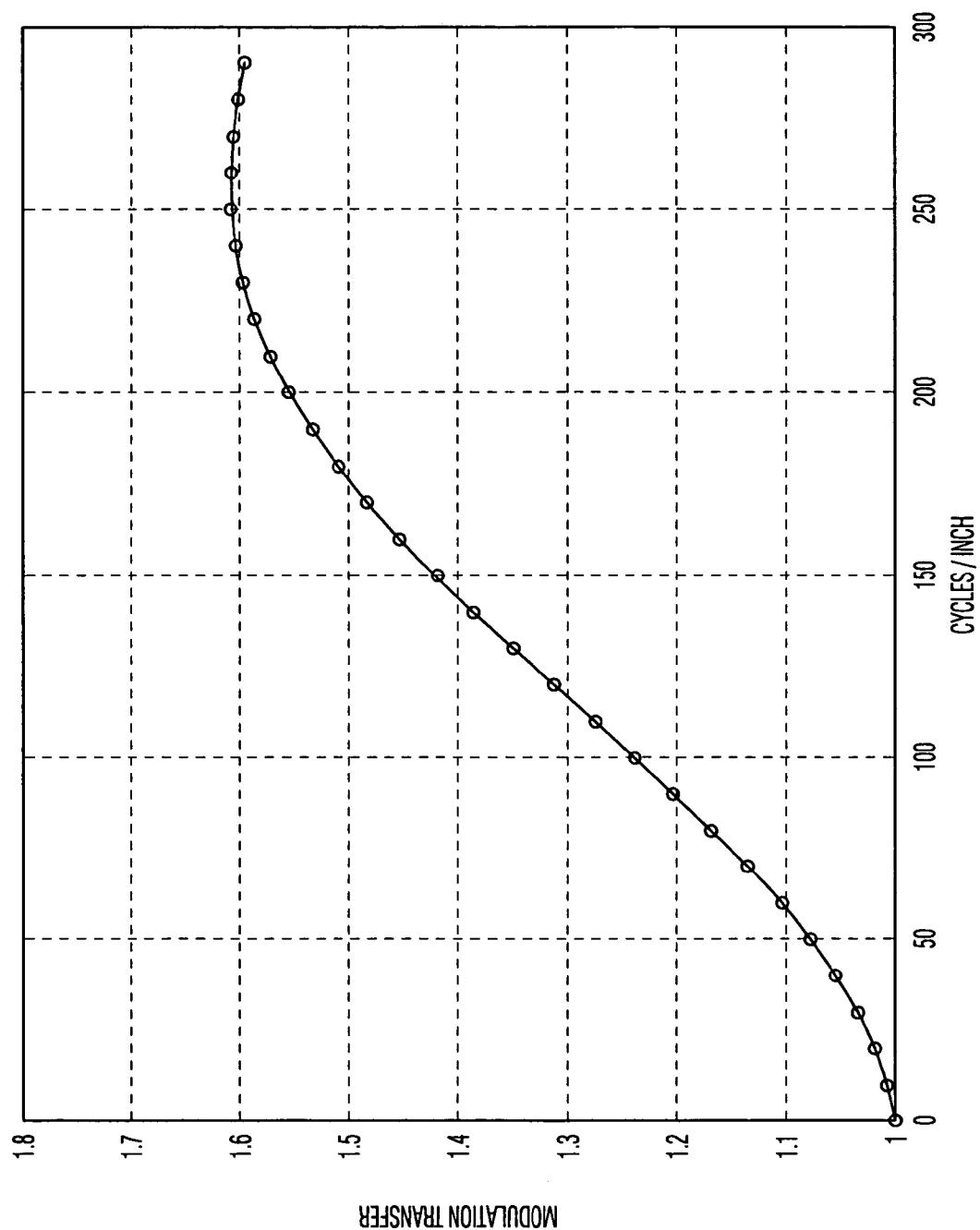
FIG. 6 is a graph of a profile of a sharpening filter based on the low pass filter profile of FIG. 5.

FIG. 6 is an MTF graph resulting from the above described operations on the original image filtering profile of FIG. 5. FIG. 6 illustrates a profile of a sharpening filter resulting from the inversion, scaling, and offsetting processes described above as performed by software. As used herein, a sharpening filter is intended to mean a frequency profile which has been operated upon in the above described manner. That is, the frequency profile is no longer strictly a low pass, high pass, or band pass, frequency profile. However, certain frequency components have been amplified. That is, for example, the amplitude of certain higher frequency components has been increased.

Program or software instructions can create a convolution filter in the spatial domain from the sharpening profile, such as the sharpening profile shown in FIG. 6. Those skilled in the art appreciate that the spatial domain is the normal imaging space, e.g., that used by a printing device to produce an image. A change in position between actual physical units of the space in which the image was captured, correspond to scaled change in position in scaled units on the image itself. For example, the units of an actual a room may be in meters. However, the scale of the image itself is in pixels. The spatial domain provides the correlation between a change in the pixel dimension and the equivalent change in the meter dimension and vice versa.

Figure 7:
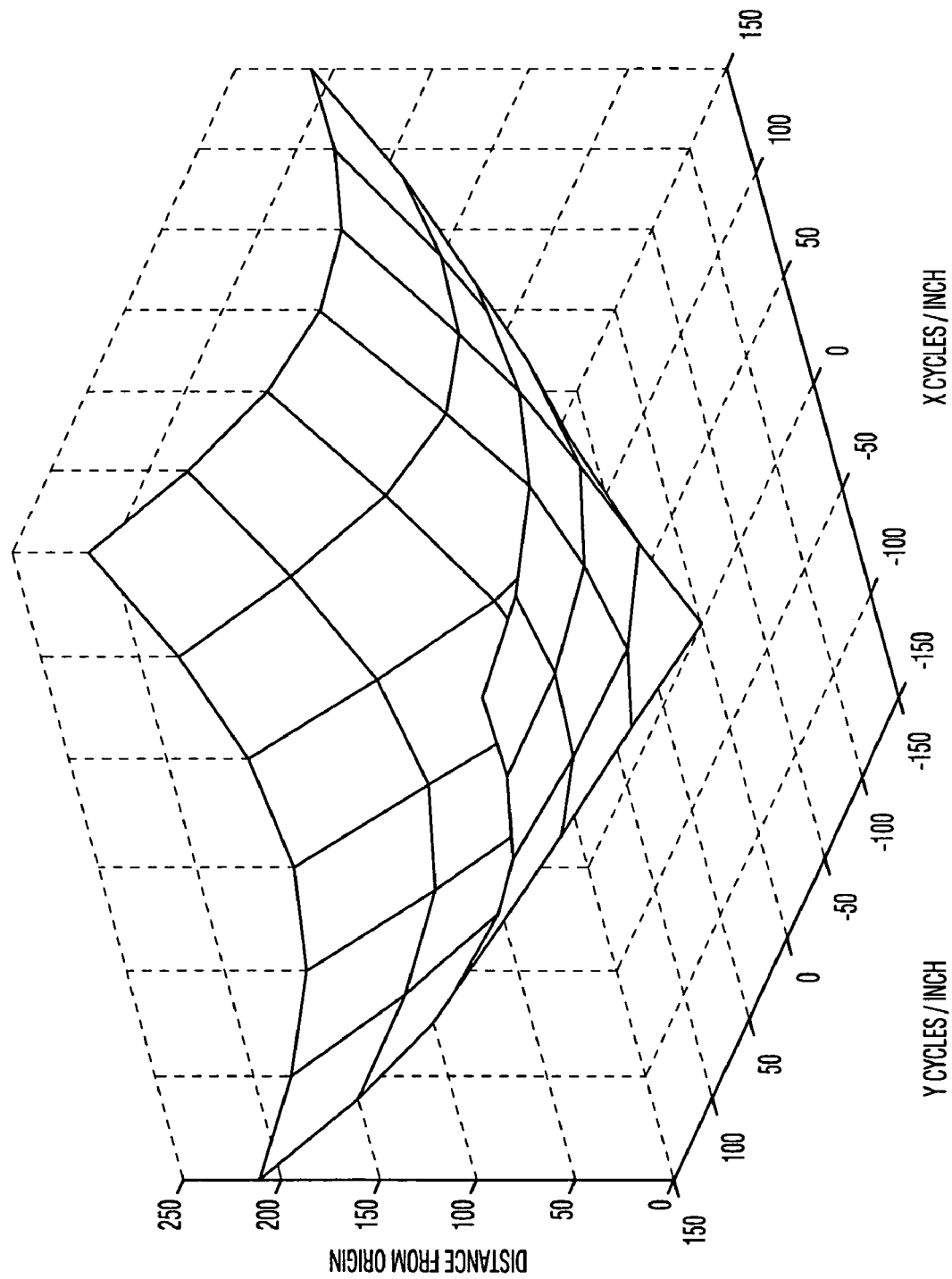
FIG. 7 is a graph illustrating the distance from the origin plotted as a function of the coordinates of a mesh.

A convolution filter, for example as shown in FIG. 7, can be created using a program. In defining the x and y axes, a two dimensional mesh in the frequency domain can be formed. For instance, the two dimensional mesh can be formed from gridding coordinates in the x-axis and y-axis dimensions from −Nyquist frequency to +Nyquist frequency, with the 0 frequency represented at 0 on both the x and y axes. Those skilled in the art will appreciate that the Nyquist frequency is the frequency above which a given sampling rate produces aliasing.

The frequency distance from the origin (e.g., the x and y 0 frequency values) of any point in the two dimensional mesh can be calculated from the x-y values of the mesh and can be shown in a third dimension as shown in FIG. 7. FIG. 7 is a graph illustrating the distance from the origin plotted as a function of the coordinates of such a mesh. In the graph of FIG. 7, the distance from the origin is shown as the third, or z-axis.

Figure 8:
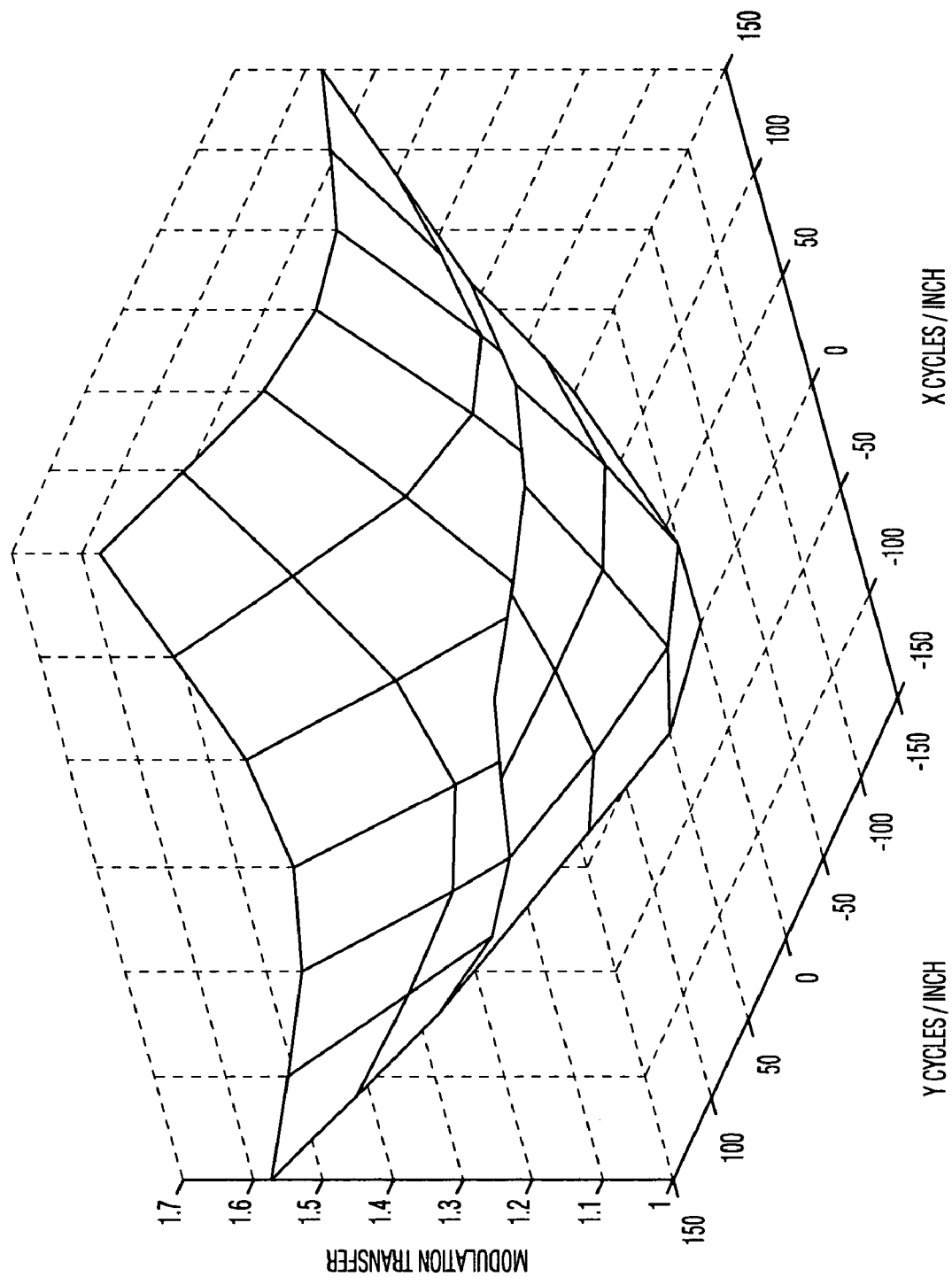
FIG. 8 is a graph illustrating sharpening values as a function of a frequency domain two dimensional mesh.

FIG. 8 is a graph illustrating sharpening graph of FIG. 7 after a one dimensional interpolation of the values of FIG. 6 has been made to convert the distance to the origin values into modulation transfer values. Thus, FIG. 8 shows the sharpening profile values of FIG. 6 as interpolated to the three dimensional Nyquist mesh, creating a three dimensional sharpening mesh.

As stated above, a convolution filter can be created by program embodiments. In this process, a two dimensional inverse Fourier transformation process can be applied to the graph shown in FIG. 8. In this way, the three dimensional frequency domain sharpening mesh of FIG. 8 can be converted to a convolution filter in the spatial domain, as illustrated in FIG. 9A.

Figure 9A:
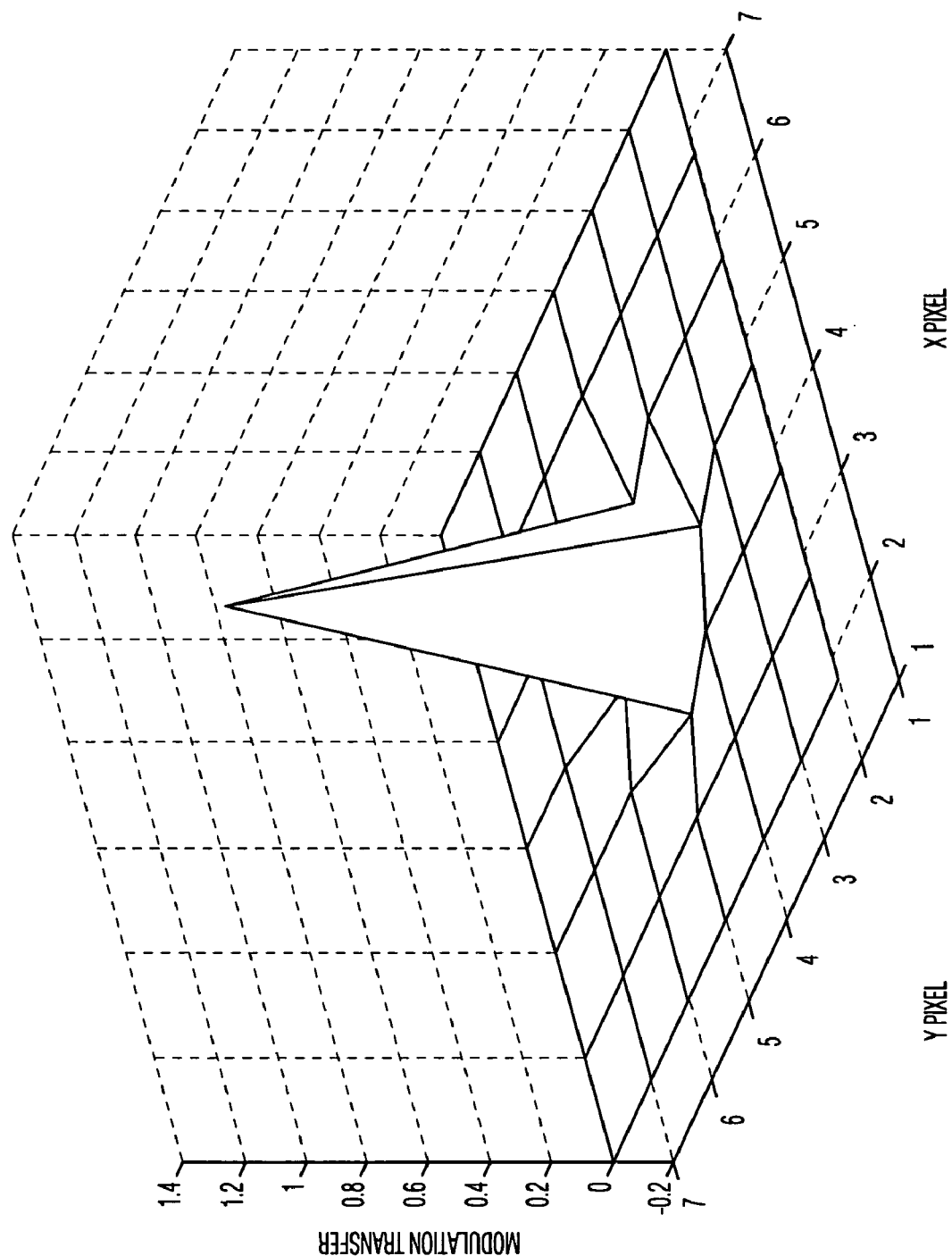
FIG. 9A is a graph illustrating values of a convolution filter in the spatial domain.
Figures 9B, 10:
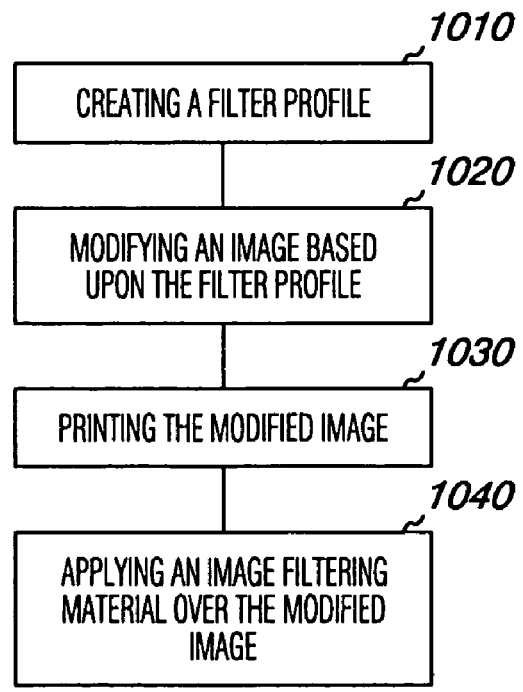
FIG. 9B is a table of values corresponding to values of FIG. 9A.
FIG. 10 is an exemplary embodiment of a method for filtering an image on a print media.

FIG. 9A is a graph illustrating values of a convolution filter in the spatial domain. FIG. 9B is a table of values corresponding to values of FIG. 9A. That is, FIG. 9A, and the values shown in table 9B, result from applying an inverse Fourier transformation process to the graph shown in FIG. 8. The resulting values, illustrated in table 9B, can be applied to pixel values through a convolution process to adjust the image. Those skilled in the art will understand how to apply a convolution process to the pixel values of the image.

Once the convolution filter is created, e.g. such as the filter illustrated in FIGS. 9A and 9B, images can be adjusted using the convolution filter values. For example, a coating, as has been described herein, can be applied. In this manner, a counterbalance is achieved between the electronic effects which result from the digital sharpening process and the physical, optical effects which result from the application of an image filtering material to the image.

Figure 11:
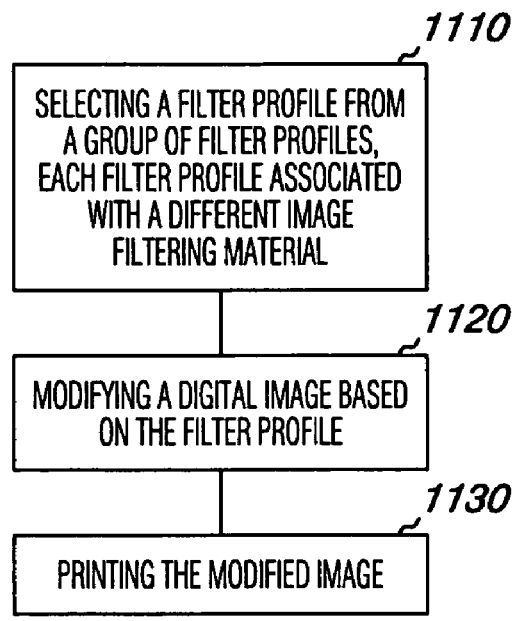
FIG. 11 is another exemplary embodiment of a method for filtering an image on a print media.
Figure 12:
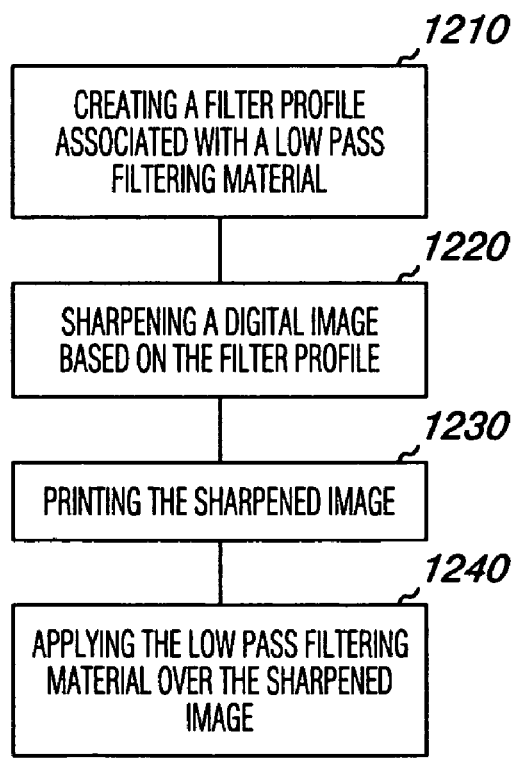
FIG. 12 is another exemplary embodiment of a method for filtering an image on a print media.

FIGS. 10-12 illustrate exemplary method embodiments of the present invention. FIG. 10 is a block diagram illustrating a method for filtering an image on print media. As illustrated in FIG. 10, the method includes creating a filter profile at block 1010. The filter profile can be associated with an image filtering material. The filter profile can include a low pass filter profile. The low pass filter profile can represent characteristics of the image filtering material.

The method also includes modifying an image based upon the filter profile at block 1020. Modifying an image can include creating a sharpening filter from the filter profile. A convolution filter can be created from the sharpening filter. The modified image can be printed as shown in block 1030. An image filtering material can be applied over the modified image as shown in block 1040.

FIG. 11 is a block diagram illustrating a method for filtering an image on print media. The method includes selecting a filter profile from a group of filter profiles, each filter profile associated with a different image filtering material at block 1110. The method also includes modifying a digital image based on the filter profile at block 1120. Modifying a digital image can include defining a sharpening filter from the filtering profile. In the exemplary method shown in FIG. 11, the method also includes printing the modified image at block 1130.

The method can include applying an image filtering material over the modified image. Applying an image filtering material con include applying a layer of adhesive and a layer of film. The layer of adhesive and the layer of film, when combined, can have a filter profile within the group of filter profiles.

FIG. 12 is a block diagram illustrating a method for filtering an image on print media. The method of FIG. 12 includes creating a filter profile associated with a low pass filtering material at block 1210. The method also includes sharpening a digital image based on the filter profile at block 1220. In block 1230, the method includes printing the sharpened image. The low pass filtering material can be applied over the sharpened image at block 1240. Applying a low pass filtering material can include applying an ethylene vinyl acetate adhesive and a polyester film.

Although specific exemplary embodiments have been illustrated and described herein, those of ordinary skill in the art will appreciate that an arrangement calculated to achieve the same techniques can be substituted for the specific exemplary embodiments shown. This disclosure is intended to cover adaptations or variations of the embodiments of the invention. It is to be understood that the above description has been made in an illustrative fashion, and not a restrictive one.

Combination of the above exemplary embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single exemplary embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed exemplary embodiment. Thus, the following claims are hereby incorporated into the Detailed Description, with each claim standing on its own as a separate embodiment.

What is claimed:

1. A printing device, comprising:
   a program to apply a filter profile associated with an image filtering material and to adjust an image based upon the filter profile; and
   a print engine in communication with the program to print an image, adjusted based on the filter profile, on a print media.

2. The printing device of claim 1, wherein the program adjusts an image by performing electronic image sharpening.

3. The printing device of claim 2, wherein performing electronic image sharpening includes digital image processing to increase an amplitude of certain frequencies of an image in a frequency domain.

4. The printing device of claim 2, wherein performing electronic image sharpening includes using the program to create a sharpening filter.

5. The printing device of claim 4, wherein using the program to create a sharpening filter includes creating a sharpening profile wherein an amplitude of certain high frequency components have been increased.

6. The printing device of claim 4, wherein using the program to create a sharpening filter includes creating a sharpening profile by applying an inversion, a scaling, and an offsetting process to a low pass filter profile.

7. The printing device of claim 1, wherein the device further comprises a lamination component operable to deposit an image filtering material over the image on the print media.

8. The printing device of claim 7, wherein the image filtering material includes a low pass filtering material.

9. The printing device of claim 1, wherein the printing device is an electrophotographic printer.

10. The printing device of claim 1, further including a toner reservoir having an integrated memory device.

11. The printing device of claim 10, wherein the filter profile is stored on the integrated memory device.

12. A printing system, comprising:
    a printing device for printing an image on a print media;
    means associated with the printing device for creating a filter profile associated with an image filtering material and for adjusting an electronic image based upon the filter profile; and
    means associated with the printing device for depositing the image filtering material on the print media.

13. The printing system of claim 12, wherein the means for creating a filter profile includes software to perform digital image sharpening on an image.

14. The printing system of claim 13, wherein the means for creating a filter profile includes using software to create a low pass filter profile in a frequency domain.

15. The printing system of claim 14, wherein the software further operates on the low pass filter profile to perform an offset function, a scaling function, and an inversion function in order to produce a sharpening filter.

16. The printing system of claim 15, wherein the software is operable to create a convolution filter in a spatial domain from the sharpening filter.

17. The printing system of claim 16, wherein the software operable to create a convolution filter includes software to grid coordinates in an x-axis, a y-axis, and a z-axis dimension, wherein the x-axis and y-axis dimensions form an x-y plane having an origin, and wherein distances of a number of points on the x-y plane from the origin are defined in the z-axis dimension.

18. The printing system of claim 17, wherein the software further applies a two dimensional inverse Fourier transformation process.

19. The printing system of claim 12, wherein the means for depositing an image filtering material on the print media includes manually applying the image filtering material.

20. The printing system of claim 12, wherein the means for depositing an image filtering material on the print media includes utilizing a laminating device to deposit the image filtering material.

21. A method for filtering an image on print media, comprising;
    creating a filter profile associated with an image filtering material;
    modifying an image based upon the filter profile;
    printing the modified image on a print media; and
    applying an image filtering material over the modified image.

22. The method of claim 21, wherein modifying the image includes creating a sharpening filter from the filter profile.

23. The method of claim 22, further including creating a convolution filter from the sharpening filter.

24. The method of claim 21, wherein creating the filter profile includes creating a low pass filter profile.

25. The method of claim 24, wherein creating the low pass filter profile includes creating the low pass filter profile to represent characteristics of the image filtering material.

26. A method for filtering an image, comprising;
    selecting a filter profile from a group of filter profiles, each filter profile associated with a different image filtering material;
    modifying a digital image based on the filter profile; and
    printing the modified image on a print media.

27. The method of claim 26, wherein the method further includes applying an image filtering material over the modified image.

28. The method of claim 27, wherein applying the image filtering material includes applying a layer of adhesive and a layer of film.

29. The method of claim 28, wherein the layer of adhesive and the layer of film, when combined, have a filter profile within the group of filter profiles.

30. The method of claim 26, wherein modifying a digital image includes defining a sharpening filter from the filter profile.

31. A computer readable medium having a set of computer executable instructions thereon for causing a device to perform a method, the method comprising:
    creating a filter profile associated with a low pass filtering material;
    sharpening a digital image based on the filter profile;
    printing the sharpened digital image on a print media; and applying the low pass filtering material over the sharpened digital image.

32. The computer readable medium of claim 31, wherein applying the low pass filtering material includes applying an ethylene vinyl acetate adhesive and a polyester film.

33. A print media, comprising:

an image deposited on the print media, wherein the image has been sharpened based on a filter profile created in association with an image filtering material; and wherein the image filtering material is deposited over the image.

34. The print media of claim 33, wherein the image filtering material includes ethylene vinyl acetate.

35. The print media of claim 33, wherein the image filtering material includes a polyester film.

* * * * *